United States Patent

Medici, Jr. et al.

[11] Patent Number: 6,132,075
[45] Date of Patent: *Oct. 17, 2000

[54] MULTICHANNEL WAVE SCREW WITH A SLUSH CHANNEL BARRIER SECTION

[75] Inventors: John C. Medici, Jr., Fredericktown; Stephen T. Takashima, Mansfield; William N. Calland, Mt. Vernon, all of Ohio

[73] Assignee: HPM Corporation, Mount Gilead, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/160,982

[22] Filed: Sep. 25, 1998

[51] Int. Cl.$^7$ ....................................................... B29B 7/14
[52] U.S. Cl. ................................. 366/79; 366/89; 366/90
[58] Field of Search ................................. 366/79, 80, 81, 366/88, 89, 90, 318, 322, 323, 324

[56] References Cited

U.S. PATENT DOCUMENTS

| | | | |
|---|---|---|---|
| 2,753,595 | 7/1956 | Dulmage | 18/12 |
| 3,271,819 | 9/1966 | Lacher | 18/12 |
| 3,367,635 | 2/1968 | Gresch | 366/80 |
| 3,599,292 | 8/1971 | Ronzoni | 18/30 |
| 3,671,021 | 6/1972 | Pomper et al. | 366/89 |
| 3,701,512 | 10/1972 | Schippers et al. | 366/81 |
| 3,737,151 | 6/1973 | Schaeffer et al. | 366/89 |
| 3,858,856 | 1/1975 | Hsu | 366/88 |
| 3,867,079 | 2/1975 | Kim | 425/208 |
| 3,870,284 | 3/1975 | Kruder | 366/82 |
| 4,000,884 | 1/1977 | Chung | 366/88 |
| 4,060,226 | 11/1977 | Schweller | 366/75 |
| 4,074,362 | 2/1978 | Kruder et al. | 366/82 |
| 4,107,788 | 8/1978 | Anders | 366/81 |
| 4,112,519 | 9/1978 | Kruder | 366/266 |
| 4,128,341 | 12/1978 | Hsu | 366/89 |
| 4,143,974 | 3/1979 | Strassheimer et al. | 366/78 |
| 4,154,536 | 5/1979 | Sokolow | 366/90 |
| 4,173,417 | 11/1979 | Kruder | 366/89 |
| 4,185,060 | 1/1980 | Landley, Jr. | 264/54 |
| 4,201,481 | 5/1980 | Iddon et al. | 366/79 |
| 4,215,978 | 8/1980 | Takayama et al. | 425/190 |

(List continued on next page.)

FOREIGN PATENT DOCUMENTS

| | | |
|---|---|---|
| 61-222706 | 10/1986 | Japan . |
| 62-42820 | 2/1987 | Japan . |
| 63-104811 | 5/1988 | Japan . |

OTHER PUBLICATIONS

Spirex, Screw and Barrel Technology, pp. 21,22, copyright 1985.

*Primary Examiner*—Tony G. Soohoo
*Attorney, Agent, or Firm*—Baker & Daniels

[57] ABSTRACT

A multichannel wave screw with a slush channel barrier section adapted to provide a consistent mixture of 50% solids and 50% melt to both channels of the double wave metering section. The screw includes a barrier flight having a relatively large initial clearance which allows solids to enter the newly formed slush channel. The barrier flight gradually decreases in clearance to a final barrier flight clearance which allows some dispersed solids to enter the slush channel. At the terminal end of the barrier section, the barrier flight abruptly increases its pitch, thereby abruptly narrowing the solids channel and therefore forcing solid material over the barrier flight and into the slush channel. In this manner, a uniform mixture of solid and melt is provided to the multi-channel wave metering section.

20 Claims, 3 Drawing Sheets

U.S. PATENT DOCUMENTS

| | | | |
|---|---|---|---|
| 4,227,870 | 10/1980 | Kim | 425/208 |
| 4,277,182 | 7/1981 | Kruder | 366/89 |
| 4,314,765 | 2/1982 | Hotz | 366/75 |
| 4,330,214 | 5/1982 | Willert | 366/79 |
| 4,573,799 | 3/1986 | Anders | 366/89 |
| 4,729,662 | 3/1988 | O'Brien | 366/79 |
| 4,733,970 | 3/1988 | Yokana | 366/79 |
| 4,840,492 | 6/1989 | Nakamura | 366/81 |
| 4,896,969 | 1/1990 | Dray | 366/88 |
| 4,925,313 | 5/1990 | Nunn | 366/81 |
| 4,944,906 | 7/1990 | Colby et al. | 264/101 |
| 4,946,356 | 8/1990 | Kumazaki | 425/135 |
| 5,033,860 | 7/1991 | Nakamura | 366/89 |
| 5,035,509 | 7/1991 | Kruder | 366/89 |
| 5,071,256 | 12/1991 | Smith et al. | 366/89 |
| 5,088,914 | 2/1992 | Brambilla | 366/81 |
| 5,288,223 | 2/1994 | Toro | 425/208 |
| 5,486,328 | 1/1996 | Luker | 264/211.23 |
| 5,534,204 | 7/1996 | Aoki et al. | 264/102 |
| 5,551,777 | 9/1996 | Tjahjadi et al. | 366/100 |
| 5,597,525 | 1/1997 | Koda et al. | 264/537 |
| 5,599,097 | 2/1997 | Christie | 366/88 |
| 5,599,098 | 2/1997 | Christie | 366/90 |
| 5,630,968 | 5/1997 | Wang et al. | 264/53 |

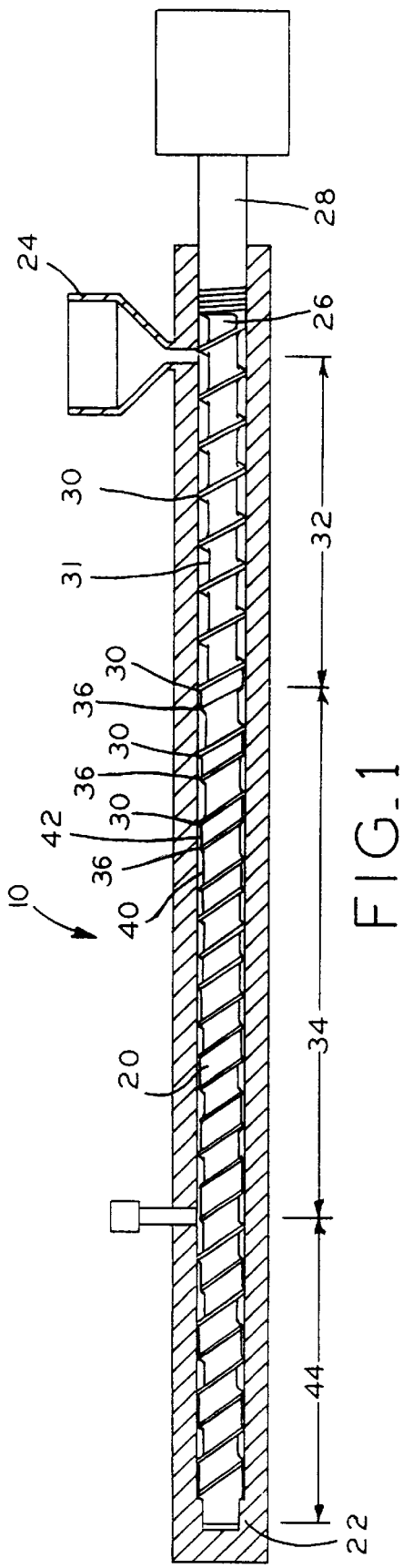
FIG_1
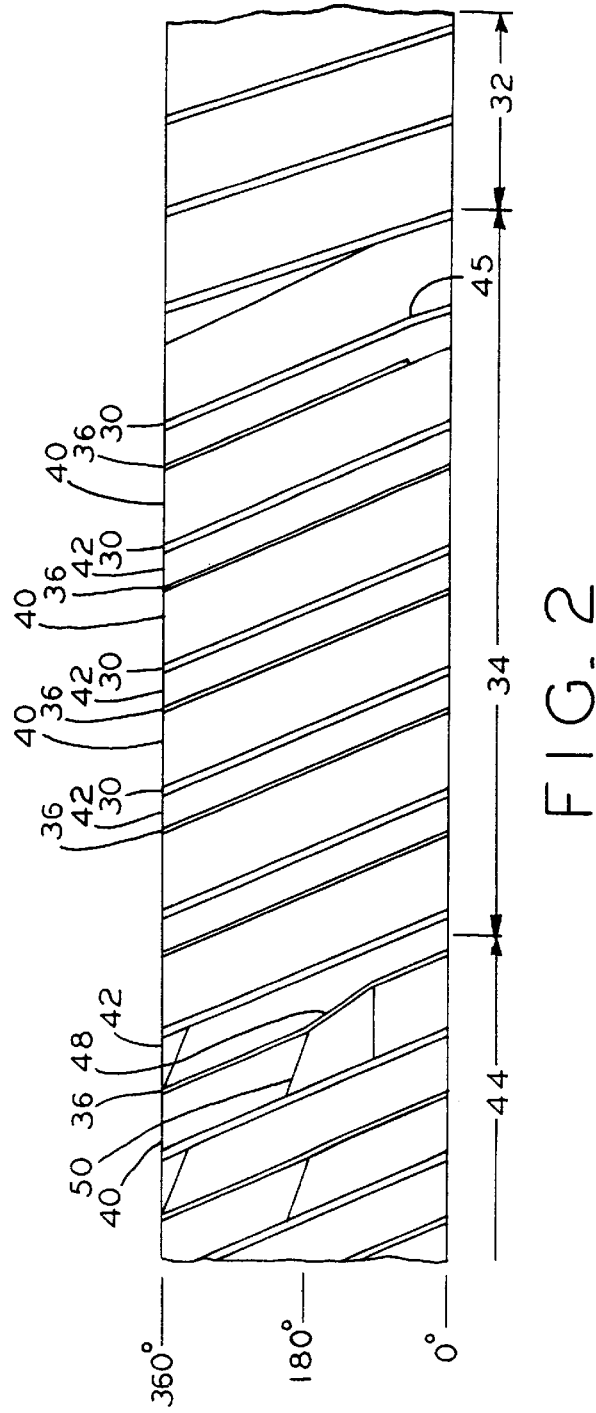
FIG_2

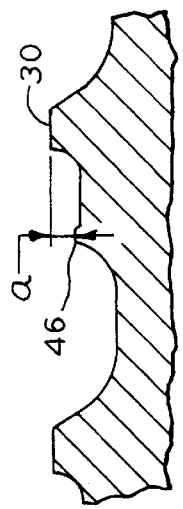
FIG._4
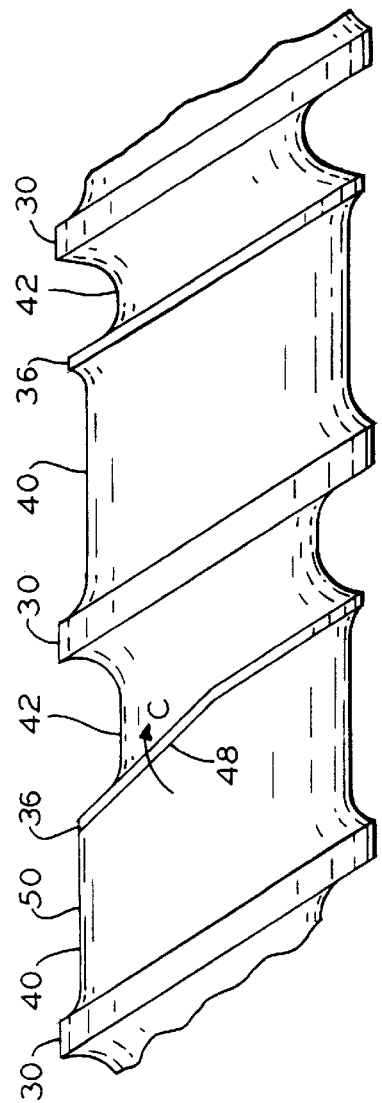
FIG._5
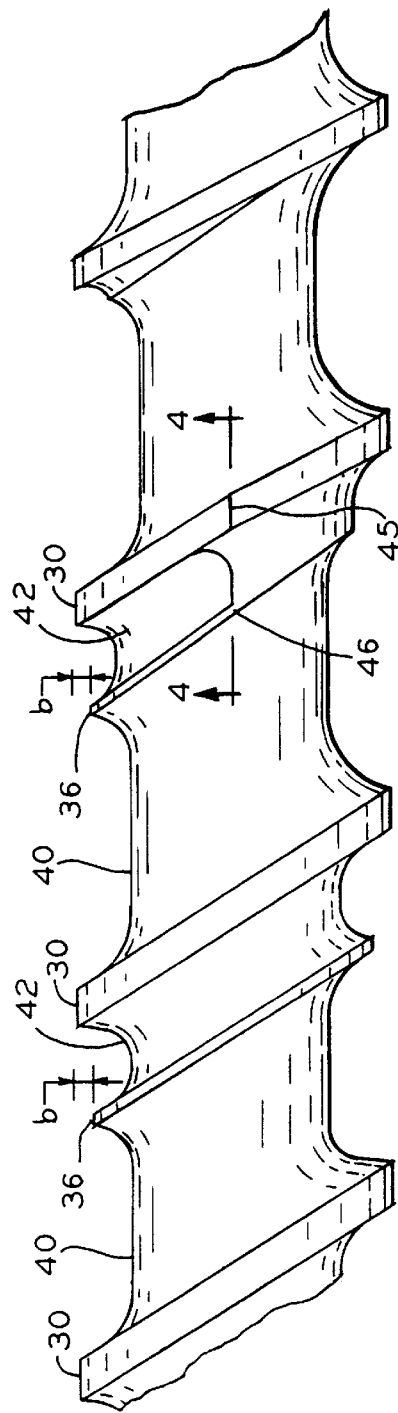
FIG._3

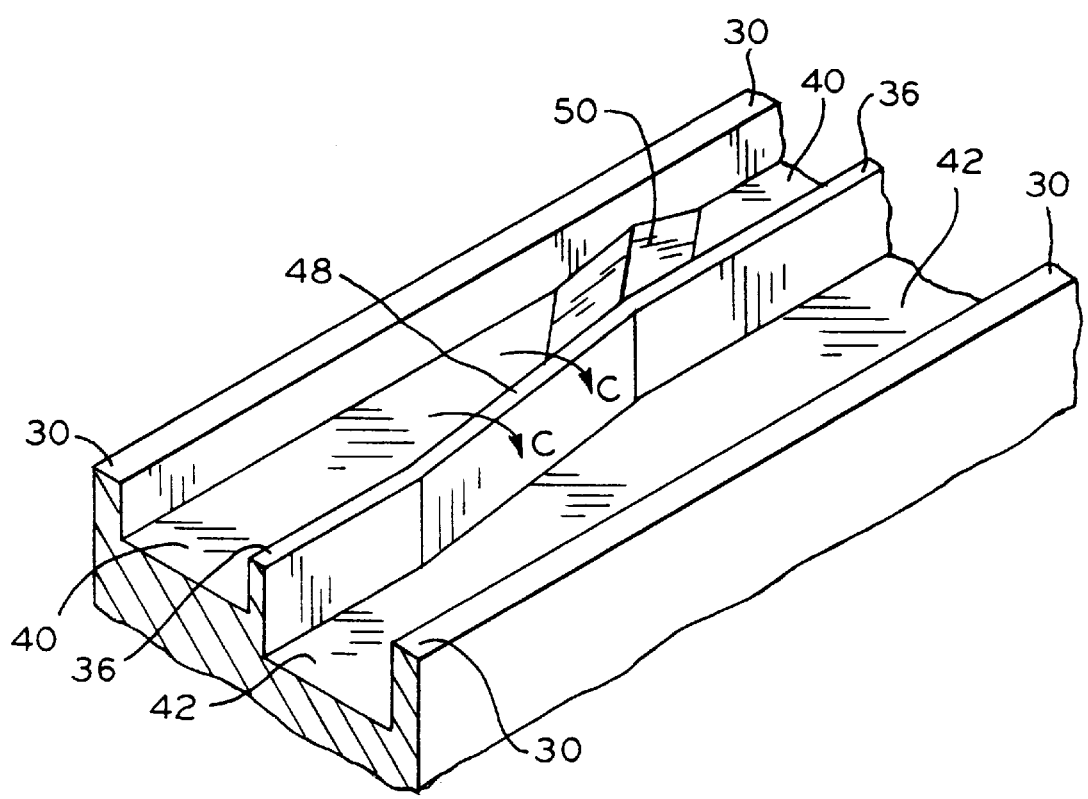
FIG_6

MULTICHANNEL WAVE SCREW WITH A SLUSH CHANNEL BARRIER SECTION

This is a Continued Prosecution of application Ser. No. 09/160,982, filed Sep. 25, 1998.

BACKGROUND OF THE INVENTION

This invention relates to extruders of the type in which a screw, rotatable within a barrel, is employed to extrude material through a die or into an injection mold connected to the outlet end of the barrel. The invention is concerned particularly with improvements in high output plasticating extruders.

A plasticating extruder receives polymer pellets or powder (often together with formulation additives in liquid or particle form), works and raises the temperature of the polymer sufficiently to dispose it in a melted or plastic state, and delivers the melted polymer under pressure through a restricted outlet or die. Ordinarily, it is desirable that the discharge extrudate be fully melted, well mixed, uniform in temperature and pressure, and substantially free of small jells and other fine structure agglomerations. It is also desirable that the rate of delivery of the molten polymer through the die be regulated simply by changing the rate of extruder screw rotation and that the rate of delivery of the selected screw speed be substantially uniform.

The basic extruder apparatus includes an elongated barrel which may be heated or cooled at various locations along its length and a screw which extends longitudinally through the barrel. The screw has a helical conveying flight on its surface which cooperates with the cylindrical internal surface of the barrel to define an elongated helical channel.

A typical modern extruder screw includes a plurality of sections configured specifically to the attainment of particular functions. One common design includes a feed section, transition section, and a multi-channel wave metering section. The feed section extends beneath and forwardly from a feed opening where polymer in pellet or powder form is introduced into the extruder to be carried forward along the inside of the barrel by the feed section of the screw. As the polymer material is advanced along the channel, it is worked by the helical threads and barrel. This, in turn, generates heat, and melting of the polymer proceeds as the material is moved along the feed section.

Downstream from the feed section is a conventional single channel transition section of decreasing channel depth in which melting of the material continues as it moves therethrough. Actually, the melting takes place for the most part near the barrel surface at an interface between a film of molten polymer and a solid bed of packed particle polymer. The thin layer of melt film sticks to the barrel wall, but is scraped off by the rotating screw flight and therefore collects in front of the flight. Thus, a somewhat stratified channel composition develops in which a solids bed is positioned at the trailing side of the flight whereas the melt is positioned at the front side, or pushing side of the flight. Toward the end of the transition section, however, after about 40% to 70% of the polymer has been melted, some of the solid bed breaks up and small particles of solid polymer become dispersed in the body of molten polymer.

A partially stratified composition exists at the end of the transition section and is emptied into the multichannel wave metering section, whose function is to exert a pumping action on the molten polymer. The multichannel wave metering section is a melter and a mixer. Typically, two helical flow channels extend through the metering section and are separated by a barrier flight. Each flow channel includes repeating wave cycles of varying depth, having alternating wave crests and valleys. The wave cycles of the adjacent channels are typically helically offset so that a wave crest of one channel lies opposite a valley in the adjacent channel and vice versa. The barrier flight is undercut in a manner which facilitates the flow of melt thereacross from one channel to the other, while restricting the flow thereacross of unwanted solids. Solids therefore tend to pass instead through a restriction formed by the wave crest while the melt travels across the barrier flight into the adjacent channel, thereby minimizing the formation of pressure pulses in the extrudate flow. Such a double wave design is well known and is disclosed in U.S. Pat. No. 4,173,417 which is assigned to the assignee of the present invention, and is incorporated herein by reference.

Improvements in the above-described design as disclosed in U.S. Pat. No. 4,173,417 have been directed to the multichannel wave metering section, while leaving the conventional transition section unchanged. For example, U.S. Pat. No. 4,925,313 which is assigned to the assignee of the present invention, discloses a double wave metering section having two barrier flights which include segments that are of normal height and are in relatively close clearance with the inner wall of the barrel. The two barrier flights also include undercut segments which form larger gaps between the barrel wall than do the normal segments. Thus the normal height barrier flight segments are separated by undercut segments which extend from one peak to the next peak of the adjacent channel. U.S. Pat. No. 5,035,509, assigned to the assignee of the present invention, discloses a double wave metering section wherein the barrier flight forms a zig-zag shape which divides the helical passage into channels of varying cyclic depth in the helical direction of the channels. Further developments include a triple channel wave screw as disclosed in U.S. Pat. No. 5,219,590, also assigned to the assignee of the present invention. As noted, all of these improvements are directed to the multi-channel wave metering section of the screw while leaving the design of the conventional transition section unchanged.

A second common extruder screw design, referred to as a "barrier screw," utilizes the well established mechanism by which most of the melting occurs near the barrel surface. Such a screw includes a feed section, a barrier melting section and a metering section, the barrier melting section and metering section performing somewhat different functions than the transition section and the multichannel wave metering section described above.

The barrier melting section begins at the terminal end of the feed section, whereby a barrier flight is introduced intermediate the helical thread of the primary flight, typically branching from the primary flight at an increased pitch. The increased pitch of the barrier flight typically continues for one or more turns until the barrier flight is located in a pre-determined position in the channel formed by the primary thread and the barrier thread. Thereupon, either the main flight or the barrier flight changes pitch so that the two flights are parallel throughout the remainder of the barrier melting section.

Thus, the barrier melting section is comprised of two adjacent helical channels, a solids channel and a melt channel, with the barrier flight disposed therebetween. As the screw rotates, the thin melt film which develops at the outer periphery of the solids channel is conveyed over the barrier flight and into the melt channel. The barrier flight is "undercut," providing increased clearance with the barrel wall to facilitate the conveyance of melt thereover. In this manner, melted material is continuously conveyed from the thin melt film into the melt channel, thereby encouraging further solids to melt into the melt film.

Traversing downstream, then, the melt channel begins to fill, whereas the solids channel empties. Barrier melting sections are designed accordingly so that as one traverses downstream, the melt channel deepens whereas the solids channel becomes more shallow, thereby accommodating the increased amount of melt material and the decreased amount of solid material in the respective channels. Barrier screws are well known and examples are shown in U.S. Pat. No. 3,698,541 to Barr, and U.S. Pat. No. 3,858,856 to Hsu.

A "barrier screw" is typically designed to melt the majority of the output in the barrier section, and is made as long as is necessary to accomplish the majority of the melting. Significantly, the clearance of the barrier flight is adapted so that solid material cannot cross thereover and enter the melt channel. Accordingly, traversing downstream along the barrier section, two distinct channels emerge, one of which conveys predominantly melted material and the other of which conveys predominantly solids material. Strict design of barrier clearances and entry and exit from the barrier section are necessary in order to keep the melt material separate from the solid material.

A conventional barrier melting section normally exits into a single channel metering section of constant shallow depth. Because melting is accomplished primarily in the barrier section, the metering section in a barrier melting screw is designed merely to provide uniform output approximately proportioned to the screw rotational speed, i.e., to deliver high quality polymer melt at a uniform rate. Accordingly, each turn of the constant depth metering section reinforces the flow characteristics generated by adjacent turns, and serves to facilitate this goal.

Improvements in the above described "barrier screws" have been directed to enhancing the melting efficiency of the barrier section.

Screws of the two designs described above have improved considerably over the past quarter century. However, it is desirable to achieve a more efficient extruder screw, one in which output quantity and quality is further improved.

SUMMARY OF THE INVENTION

The multi-channel wave screw with a slush channel barrier section of the present invention uses a novel barrier section design to provide a consistent mixture of melt and solid material to a multi-channel wave metering section of an extruder screw. Multi-channel wave metering screws and barrier melting screws are well known. However, the present invention combines the two technologies in a way which completely changes the design and purpose of a conventional barrier melting section.

In one form, the present invention is a plasticating apparatus comprising a barrel having an inlet and an outlet. A rotatable screw is disposed within the barrel and cooperates with an inner wall of the barrel. The screw is adapted to plasticating resinous material fed into the barrel through the inlet. The screw comprises a feed section, a barrier section and a multi-channel wave metering section which are disposed sequentially downstream of each other along the screw. The feed section includes a main flight which forms a feed channel at the inlet of the screw. A secondary, or barrier flight, originates in the barrier section and is disposed intermediate the main flight. The secondary flight and the main flight divide the barrier melting section into a melt channel and a slush channel extending helically side-by-side. The secondary flight has helical threads with a diameter and width which are less than the diameter and width of the helical threads of the main flight. Particularly, the diameter of the secondary flight at its point of origin provides a relatively large initial clearance between the secondary flight and the inner wall of the barrel. The initial clearance is adapted to allow solids to enter the slush channel from the solids channel. This initial clearance decreases within one and one half turns about a longitudinal axis of the screw to a final barrier clearance, which is substantially constant throughout the barrier section. This final barrier clearance is also quite large as compared to a conventional barrier design and is adapted therefore to allow dispersed solid material to pass thereover.

Thus, it can be understood that the barrier section of the present invention is quite unlike conventional barrier screws in that the design actually encourages solid material to enter the open "slush channel," as opposed to a conventional "melt channel." Furthermore, dispersed solids are encouraged to enter the slush channel throughout the barrier section because the final barrier clearance is large enough to allow such passage thereover. It can thus be understood that the barrier section of the present invention is not designed like conventional prior art barrier sections, in which the goal is to maintain melt and solid materials separate. Indeed, it is an object of the barrier section of the present invention to provide a roughly equal percentage of solids and melt, in a consistent, uniform mixture, to the multi-channel wave metering section.

A preferred form of the present invention helps facilitate the goal of providing a consistent mixture of solids and melt to the multi-channel wave metering section. In this preferred form, the barrier flight includes an increased pitch section at a terminal end of the barrier section which extends no more than 1½ turns about the longitudinal axis of the screw. Thereafter, the barrier, or secondary flight, resumes substantially its original pitch. During this increased pitch section, the solids channel decreases in width and the slush channel increases in width, thereby forcing additional solid plastic material from the solids channel over the barrier flight and into the slush channel. The consistency of the mixture provided to the double wave metering section can be further enhanced by providing a wave in the solids channel at a location corresponding with the termination of the increased pitch section. Such a wave further restricts the available area for solids to pass in the solids channel and thus encourages passage of solids over the barrier flight into the slush channel. In essence, the material remaining in the solids channel at the terminal end of the transition section is "dumped" into the slush channel, thereby providing a consistent mixture of solids and melt to the metering section.

The advantage of the present invention is that it combines a novel barrier section with a multi-channel wave metering section and provides a screw with an output greater than can be achieved from either of the two technologies alone.

Another advantage of the present invention is that the barrier section, and therefore the entire screw, are shorter than in conventional designs. As noted, in a conventional design, the barrier section is designed to be long enough to ensure that most of the solid material is melted. By contrast, with the present invention, the design goal is to melt merely 50% of the solids in the barrier section so as to provide a mixture of roughly 50% solids and 50% melt material to the metering section. As a consequence, the barrier section of the present invention need not be nearly as long as in conventional designs.

Another advantage of the present invention is that the barrier clearance is not a critical design element, unlike prior art barrier screws. This is so because the barrier flight in the present invention needs only to impede the flow of large agglomerated solid chunks into the slush channel. Solids are otherwise free to enter the slush channel.

Still another advantage of the present invention is that the barrier section thereof is shorter than barrier sections of prior art screws. The barrier section of the present invention comprises roughly 20% to 40% of the flighted length of the screw, whereas a conventional barrier section typically comprises 50% to 70% of the flighted length of the screw. Thus, the present invention provides a shorter screw.

Yet another advantage of the present invention is that it permits deeper melt channel designs without fear of stagnation and degraded material in the melt channel. Unlike the melt channel of conventional barrier screws, the slush channel of the present invention includes solids which actually scour the channel as they flow downstream. With melted material, the shear field is generally assumed to be linear with distortions caused by wall effects. As the channel depth increases or the width of the channel decreases, the wall effects become more pronounced and tend to stagnate the flow near the bottom corners of the channel. With the high percentage of suspended solids in the slush channel of the present invention, "plug flow" develops and the shear field is confined to areas near the walls and floor of the channel. The plug flow allows the channel to be deeper without stagnation. Thus, the slush channel of the present invention is deeper than conventional melt channels. As a result, the present invention provides improved melting and a high throughput in the barrier section.

Because the present invention employs a wave section to complete the melting of the plastic material, the barrier section of the present invention is not limited by melting constraints present in prior art barrier screws. A conventional barrier screw becomes less effective as the percentage of melt material increases because more of the channel must be allocated to conveying melt in order to prevent stagnation. Thus, in a conventional screw, the end of the barrier section becomes inefficient. By contrast, the barrier section of the present invention is more efficient because the inefficient section conveying a high percentage of melt material has been eliminated. With the present invention, complete melting is undesirable. As a result, the melting effectiveness per inch of screw length in the present invention is higher than in prior art barrier screws. Furthermore, the present invention produces a shorter screw.

Still another advantage of the present invention is that it more effectively uses a wave section. A conventional wave section must be designed to melt agglomerated chunks after solid bed breakup occurs. Also, the wave section must finish melting the suspension and add distributive mixing. Two melting mechanisms are normally at work in a wave section. First, a series of short transition sections (peaks or crests) shear the agglomerated chunks. A barrier separates the short transition sections from adjacent deep valleys and strains out solids while the melt flows easily into the valleys. The clearances are set for the anticipated chunk size. The second mechanism is the mixing resulting from "sloshing" material back and forth between adjacent channels. Significantly, this second mechanism is much more effective after the chunks are broken up. With the present invention, large agglomerate chunks are typically eliminated in the barrier section. Advantageously, then, the wave section of the present invention can be designed with emphasis on the second of the above-described mechanisms.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a side elevational view of an extruding apparatus, with a portion of the barrel broken away to expose the screw according to the present invention;

FIG. 2 is a fragmentary side elevational view in 360° unwrapped increments placed adjacent to one another of the extruder screw of the present invention;

FIG. 3 is a fragmentary, enlarged side elevational view of the origin of the barrier flight of the present invention;

FIG. 4 is a fragmentary enlarged side elevational view as in FIG. 3, except that the screw shown in FIG. 4 is rotated 90° so that line 4—4 of FIG. 3 is positioned at the top in FIG. 4;

FIG. 5 is a fragmentary, enlarged side elevational view illustrating the terminal end of the barrier section of the present invention; and FIG. 6 is a fragmentary, perspective view of the terminal end of the barrier section of the present invention.

Although the drawings represent embodiments of the present invention, the drawings are not necessarily to scale and certain features many be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

The portions of a typical extruder screw are well known to persons skilled in the art, and are disclosed in U.S. Pat. Nos. 3,870,284 and 4,173,417, both of which are assigned to the assignee of the present invention and are incorporated herein by reference. The invention can also be incorporated in injection molding machines. It will be recognized that numerous variations are possible; however, such variations are not particularly significant as far as the present invention is concerned, and they need not be referred to in detail here.

With reference to FIG. 1, there is shown a typical apparatus 10 of the present invention. Screw 20 is disposed within cylindrical barrel 22. Apparatus 10 includes a feed hopper 24 into which plastic material in the form of pellets or dry powder is fed. Screw 20 includes body 26 having a drive hub 28, and a main or primary flight 30 which traverses the length of feed section 32. Feed section 32 includes feed channel 31. Following feed section 32 is barrier section 34 in which barrier flight 36 originates. As discussed in detail below, barrier flight 36 disposed intermediate main flight 30 in barrier section 34 divides the screw into two helically side-by-side channels, solids channel 40 and slush channel 42. At its terminal end, barrier section 34 empties into a double wave metering section 44 as shown in FIG. 1.

As shown in FIG. 2, at the end of feed section 32, barrier flight 36 branches from main flight 30 and is generated ahead of primary flight 30 by machining its helix angle at a greater angle than that of flight 30 for approximately one turn or until the flight leads the pitch of the primary flight by about ⅓ of the width of the total feed channel. At this point, shown as kink 45 in FIGS. 2 and 3, the helix angle of main flight 30 is changed to run parallel to the barrier flight 36 throughout the barrier section 34. The embodiment shown in FIG. 1 is designed so that solids channel 40 and feed channel 31 have nearly equal widths. Such a design has been found to minimize solid bed disturbances. The respective widths of the channels 40 and 42 remain substantially constant throughout barrier section 34 as shown in FIG. 2. Solids channel 40 is a relatively wide, about twice as wide as slush channel 42 in the illustrated embodiment, in order to avoid early solid bed break-up.

At the start of barrier section 34, solids channel 40 has a depth roughly equal to the depth of feed channel 31 and gradually decreases in depth to a value between ½ and ⅛ as deep as its depth at the origin of barrier section 34. The ratio of the depth of feed channel 31 to the depth of slush channel 42 at the end of barrier section 34 is between 1.2 and 0.70. The pitch of flight 30 in feed section 32 is roughly equal to the diameter of the screw, whereas the pitch of flights 30 and 36 in barrier section 34 is roughly 1.3–2.5 times the screw diameter.

In the illustrated embodiment, the thread width of barrier flight 36 is roughly half that of primary flight 30. A thinner thread width for barrier flight 36 ensures that materials flowing over barrier flight 36 will not be subjected to large shear forces, as is desirable because about half of such material passing over flight 36 is already melted. Barrier flight 36 terminates with a conventional double wave metering section 44 as shown in FIG. 2. It is to be understood that metering section 44 can include many variations of a multichannel wave metering section, such as those disclosed in U.S. Pat. No. 4,925,313, U.S. Pat. No. 5,035,509, or U.S. Pat. No. 5,219,590, all of which are assigned to the assignee of the present invention and are hereby incorporated herein by reference.

As shown in FIGS. 3 and 4, barrier flight 36 of the present invention includes a point of origin 46 which provides a large initial clearance between the barrier flight and the inner wall of the barrel of the apparatus and is designed to allow solids to enter channel 42 from solids channel 40. Fittingly, channel 42 is referred to as a "slush channel" because of the consistency of the material conveyed therein. As seen more clearly in FIG. 4, barrier flight 36 at point of origin 46 provides a large initial clearance with the inner wall of the screw barrel as denoted by distance 'a'. Unlike conventional barrier screws, the present invention does not prevent solids from entering slush channel 42. In fact, the clearance between point of origin 46 and the interior barrier wall is roughly 0.250 inches in the illustrated embodiment, which clearance allows solids to enter slush channel 42. Further, the large initial clearance provides an escape route for material wedged in kink 45 (FIG. 3) where flight 30 is bent to a steeper pitch.

It can therefore be understood that slush channel 42 is "open" to the entrance of solids therein. In the illustrated embodiment, such an open entrance is obtained by providing a relatively large initial clearance between barrier flight 36 and the interior barrel wall. It has been found that the illustrated embodiment performs well to allow solid entry into channel 42. However, an open slush channel can be obtained in any number of ways, such as machining barrier flight 36 from the root of the screw toward the middle of channel 40, for example. An open channel, then, is one in which the screw thread provides sufficient clearance such that solids particles can enter the channel.

Traversing along barrier flight 36 from point of origin 46, within ¼ turn, or at the top of the screw shown in FIG. 3, the clearance between the barrier flight 36 and the barrel wall has decreased to distance 'b' as illustrated in FIG. 3. While barrier flight 36 increases in diameter over one quarter turn as shown in FIGS. 3 and 4, it is to be understood that the change in diameter can be more abrupt, or alternatively, more gradual and still be within the scope of the present invention. In the present embodiment, final barrier clearance 'b' is approximately 0.055 inches, which is beyond clearances for conventional barrier flight designs. Clearance 'b', because it is so large, allows some dispersed solids to flow over barrier flight 36 and into slush channel 42. Once the final barrier clearance 'b' is reached, the barrier clearance remains substantially constant throughout barrier section 34 of the extruder screw of the present invention. Similar to a conventional barrier screw, the solids channel 40 becomes progressively more shallow throughout the barrier section, whereas the slush channel 42 becomes deeper throughout the barrier section. It can thus be appreciated that the entrance and length of barrier section 34 are "open," or designed to allow solids into slush channel 42.

The present invention is designed to avoid solid bed break-up in channel 40 until the terminal end of barrier section 34. Thus, toward the terminal end of barrier section 34, channel 40 contains mostly solids. The present invention is not designed to completely melt the solids in the barrier section. Indeed, roughly 50% melting in barrier section 34 is desirable in the present invention. Because the barrier section of the present invention is not designed to completely melt the material conveyed therealong, the barrier section 34 of the present invention is only 20% to 40% of the flighted length of the screw.

The terminal end of the barrier section of the present invention is designed to "dump" the remaining solids from solids channel 40 into "slush" channel 42 and provide a consistent mixture to the double wave metering section 44. The exit of the barrier section and entry into double wave metering section 44 can be understood with reference to FIGS. 2, 5 and 6. The terminal end of the barrier section includes a section of increased pitch 48 on barrier flight 36 as shown in FIGS. 2, 5 and 6. Increased pitch section 48 extends approximately 90° about the longitudinal axis of screw 20. While the illustrated embodiment shows increased pitch section 48 extending approximately 90° about the longitudinal axis of the screw, it is anticipated that the increased pitch section could be more gradual and correspondingly extend a longer helical distance along the axis of the screw. Alternatively, increased pitch section 48 could be more abrupt and correspondingly extend a shorter helical distance. Furthermore, the thread height, or clearance of increased pitch section 48 could be reduced, or even temporarily eliminated so as to encourage further dumping of the remaining solids from solids channel 40 to slush channel 42. All of such variations in increased pitch section 48 further an object of the present invention, which is to dump the remaining solids from solids channel 40 into slush channel 42 at the terminal end of the barrier section.

Coinciding with the termination of section 48, the crest of wave 50 is formed in solids channel 40. As shown in FIG. 2, then, solids channel 40 narrows and wave 50 is disposed in channel 40 immediately afterward. The net effect of the narrowing of the solids channel accompanied by wave 50 disposed in the channel is to further encourage solid material to flow over barrier 36 and into slush channel 42. In this manner, solids are then placed into the slush channel 42 and provide a uniform mixture to metering section 44.

The object of the present invention as regards the terminal end of the barrier section can now be understood. That is, one general object of the present invention at the terminal end of the barrier section is to restrict, or reduce the available area for flow of material in the solids channel, while simultaneously increasing the available area for flow of material in the slush channel. The available area is approximately the product of the width and depth of a respective channel. Structural variations in solids channel 40, slush channel 42, barrier flight 36 and main flight 30 that achieve this goal are therefore within the spirit and scope of the present invention.

The object of the present invention of "dumping" solid material into slush channel 42 can be better understood with reference to FIG. 5 and more particularly to FIG. 6, wherein slush channel 42 of relatively narrow width widens while at the same time, solids channel 40 of relatively wide width narrows. Wave 50 disposed in channel 40 further reduces the available area provided for flow therethrough of solid material. Thus, the combined narrowing effect of channel 40 by section 48 coupled with the reduction in channel depth provided by wave 50, constricts flow in channel 40 and therefore forces solids to pass over barrier flight 36 as shown by arrows 'c'. In so doing, a larger percentage of solids is located in slush channel 42 and the goal of providing a consistent 50/50 mixture of solids and melt to the double wave metering section is attainable.

The operation of the screw in accordance with the present invention can be understood from the foregoing discussion, but is explained hereinbelow with reference to the figures. With reference to FIG. 1, plastic material in the form of pellets or dry powder is fed into hopper 24. Hopper 24 communicates with the feed section 32 and primary flight 30 conveys the plastic material therealong with screw rotation. The plastic material is heated and "worked" as it is conveyed along feed section 32 by primary, or main flight 30. That is to say, heat applied from barrel 22 and shear forces resulting from the conveyance along feed section 32 cause the solid plastic material to melt. Melting occurs primarily in the outer periphery of the channel in an area adjacent the interior wall of the screw barrel, whereby a thin layer of melt material forms. At the beginning of barrier melting section 34, as shown in FIGS. 2 and 3, undercut secondary flight, or barrier flight 36 is formed. Secondary flight 36 has a diameter considerably less than that of primary channel 30 as shown in FIG. 4. Thus, a rather large clearance is provided at the point of origin 46 of barrier flight 36, and as a consequence, solid material flows across barrier flight 36 into the newly formed slush channel 42 as shown in FIGS. 3 and 4. Thus, the consistency of material initially present in slush channel 42 is solids suspended in a melted matrix. Barrier flight 36 is intended to restrict entry of large, agglomerated chunks into slush channel 42.

It is to be therefore understood that the barrier flight of the present invention need not be a continuous solid flight. Instead the barrier flight may be comprised of barrier segments or pins or any other structure that would break up agglomerates before entering the slush channel. The design goal is to provide a suspension of pelletsized particles in a melted matrix. The double wave metering section is proficient at melting and homogenizing such a mix.

It can thus be understood that the conventional prior art approach to a barrier melting section, which is designed to separate solid and melt material throughout the barrier section, has been completely abandoned. Instead, the present invention includes an open barrier section in which the point of origin 46 of barrier flight 36 is designed to encourage solid material to enter newly formed slush channel 42. Furthermore, the final barrier clearance 'b' is of sufficiently large clearance so that dispersed solids which break away from the solid bed in channel 40 can flow over barrier flight 36 and enter slush channel 42. Thus, traversing along barrier section 34 melting is achieved near the barrel surface within solids channel 40. The melt material flows over barrier flight 36 and into slush channel 42. Also occurring in solids channel 40, particularly toward the end of barrier section 34, particles of solid material break away from the "solid bed" and become dispersed in the melt film. Some of the smaller pellet-sized particles are also conveyed over barrier flight 36. Toward the end of barrier flight 34, some solids remain in channel 40 whereas channel 42 contains mostly melt with some dispersed solids.

It is a further design goal of the present invention to provide a consistent mixture of solids and melt to the double wave metering section 44. That is, it is desirable to combine the solids from channel 40 with the slush from channel 42 to form a suspension of pellet-sized particles in a melted matrix to be fed into metering section 44. Such a mixture is comprised of 40%–60% melt material, for example. It has been found that multi-channel wave metering sections are proficient at melting and homogenizing such a mixture. This design goal is aided by providing the increased pitch section 48 of barrier flight 36 at the end of the barrier section 34. The section of increased pitch 48 of barrier flight 36 rapidly decreases the width of solids channel 40. In operation, as remaining solid material being conveyed along solids channel 40 reaches increased pitch section 48, it encounters a rather sudden decrease in available cross sectional area in which to flow. The available area is even further decreased by wave 50 disposed in solids channel 40 coinciding with the end of increased pitch section 48. These two factors combine to force solid material to cross over barrier flight 36 as shown by arrows "c" in FIGS. 5 and 6. Thereafter, a consistent suspension of pellet-sized particles in a melted matrix is fed into metering section 44. That is, no large agglomerate chucks should exit the barrier section. As a result, the double wave metering section 44 is designed to finish melting the suspension and add distributive mixing, but does not need to process agglomerated chunks, as in prior art designs.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A plasticating apparatus comprising:

a barrel having an inlet and an outlet;

a rotatable screw disposed within and cooperating with an inner wall of said barrel, said screw adapted for plasticating resinous material fed into said barrel through said inlet, said screw comprising:

a feed section, a barrier section and a multi-channel wave metering section disposed sequentially downstream along said screw;

said feed section including a main flight forming a feed channel at said inlet of said screw;

a secondary flight originating in said barrier section branching from said main flight and disposed intermediate said main flight, said secondary flight and said main flight dividing said barrier section into a melt channel and a slush channel extending helically side by side, said secondary flight having helical threads with a diameter less than the diameter of helical threads of said main flight, whereby plastic material in said melt channel flows upstream over said secondary flight into said slush channel; and said secondary flight having a point of origin which provides a large initial clearance between said secondary flight and said inner wall of said barrel, said initial clearance adapted to allow solids to enter said slush channel from said solids channel, said initial clearance decreasing within one and one half turns about a longitudinal axis of said screw to a final barrier clearance, said final barrier clearance adapted to allow dispersed solid material to pass thereover.

2. The apparatus of claim 1, wherein said secondary flight includes an increased pitch section located at a terminal end of said barrier section, said increased pitch section extending no more than one and one half turns about said longitudinal axis, said secondary flight resuming substantially its original pitch after said increased pitch section, said solids channel decreasing in width during said increased pitch section, thereby forcing solid plastic material from said solids channel to said slush channel, said slush channel increasing in width during said increased pitch section, thereby accommodating solids entering said slush channel from said solids channel.

3. The apparatus of claim 2, wherein a wave is disposed in said solids channel at a location corresponding with the termination of said increased pitch section, whereby said wave encourages passage of solids over said secondary flight into said slush channel.

4. The apparatus of claim 3, wherein said slush channel has a width of between 20% to 50% of said solids channel width substantially throughout said barrier section whereas said solids channel and said slush channel have substantially the same width throughout said metering section.

5. The apparatus of claim 2, wherein said increased pitch section extends more than 45 degrees but less than 180 degrees about a longitudinal axis of said screw.

6. The apparatus of claim 5, wherein said increased pitch section extends about one quarter turn about said longitudinal axis.

7. The apparatus of claim 2, wherein said initial barrier clearance is at least 0.020 inches.

8. The apparatus of claim 7, wherein said final barrier clearance is between 0.050 inches to 0.25 inches.

9. The apparatus of claim 1, wherein said final barrier clearance is between 0.050 inches to 0.25 inches.

10. The apparatus of claim 1, wherein said initial barrier clearance is at least 0.020 inches.

11. The apparatus of claim 1, wherein said secondary flight is discontinuous.

12. The apparatus of claim 11, wherein said secondary flight is segmented.

13. The apparatus of claim 11, wherein said secondary flight is comprised of a series of pins.

14. A plasticating apparatus comprising:

a barrel having an inlet and an outlet;

a rotatable screw disposed within and cooperating with an inner wall of said barrel, said screw adapted for plasticating resinous material fed into said barrel through said inlet, said screw comprising:

a feed section, a barrier section and a multi-channel wave metering section disposed sequentially downstream along said screw;

said feed section including a main flight forming a feed channel at said inlet of said screw;

a secondary flight originating in said barrier section and disposed intermediate said main flight, said secondary flight and said main flight dividing said barrier section into a melt channel and a slush channel extending helically side by side, said secondary flight having helical threads with a diameter less than the diameter of helical threads of said main flight, whereby plastic material flows upstream over said secondary flight from said melt channel into said slush channel;

said slush channel having an entrance initially open to entry of solids therein; and wherein at a terminal end of said barrier section, said solids channel undergoes a reduction in available area whereas said slush channel simultaneously undergoes an increase in available area, thereby encouraging solid material to dump into said slush channel from said solids channel.

15. The apparatus of claim 14, wherein said reduction in area includes said secondary flight increasing in pitch for at least one quarter turn and then returning substantially to its original pitch, whereby said solids channel narrows and said slush channel widens.

16. The apparatus of claim 14, further comprising a wave disposed in said solids channel at a location corresponding with said reduction in area.

17. The apparatus of claim 14, wherein said entrance to said slush channel includes said secondary flight branching from said main flight and having a large initial clearance with said inner wall of said barrel.

18. The apparatus of claim 17, wherein said initial clearance is at least 0.20 inches.

19. The apparatus of claim 17, wherein said initial clearance decreases within one and one half turns about a longitudinal axis of said screw to a final barrier clearance which is substantially constant throughout said barrier section, said final barrier clearance adapted to allow solid material to pass thereover.

20. The apparatus of claim 19, wherein said final barrier clearance is at least 0.050 inches.

* * * * *